United States Patent [19]
Yamaguchi et al.

[11] Patent Number: 6,047,913
[45] Date of Patent: Apr. 11, 2000

[54] DOUBLE-BEARING TYPE FISHING REEL

[75] Inventors: Nobuyuki Yamaguchi; Mikiharu Kobayashi, both of Tokyo, Japan

[73] Assignee: Daiwa Seiko, Inc., Tokyo, Japan

[21] Appl. No.: 08/821,815

[22] Filed: Mar. 21, 1997

[30] Foreign Application Priority Data

Mar. 21, 1996 [JP] Japan .................................. 8-002996

[51] Int. Cl.$^7$ ............................................. A01K 89/015
[52] U.S. Cl. ................................... 242/310; 242/321
[58] Field of Search ............................ 384/537, 559, 384/510; 242/321, 322, 310

[56] References Cited

U.S. PATENT DOCUMENTS

| | | | |
|---|---|---|---|
| 2,146,582 | 2/1939 | Kohlhepp | 242/321 |
| 2,936,200 | 5/1960 | Kelly | 384/510 |
| 3,315,913 | 4/1967 | Grieten | 242/321 |
| 3,813,136 | 5/1974 | Pitner | 384/559 |
| 5,123,609 | 6/1992 | Noda | 242/321 |

FOREIGN PATENT DOCUMENTS 4-1811  1/1992  Japan .

*Primary Examiner*—Katherine Matecki
*Attorney, Agent, or Firm*—Longacre & White

[57] ABSTRACT

A protrusion, which has three stepped recesses inside, is formed on an outer surface of a spool cover at the center which is a confronting member of a spool. A thrust bearing is fixedly set in the bottom of the recess, and a bearing is fitted in the recess. A guide member is fitted in the recess. The guide member and the bearing are prevented from coming off by a spring washer. The guide member has an inserting hole into which a spool shaft is inserted which is slightly larger in diameter than the inside diameter of the bearing. The guide member has a tapered guide surface around the inserting hole to guide the spool shaft to the inserting hole. The guide surface and the inserting hole enables smooth insertion of the spool shaft into the bearing.

2 Claims, 4 Drawing Sheets

DOUBLE-BEARING TYPE FISHING REEL

BACKGROUND OF THE INVENTION

This invention relates to a double-bearing type fishing reel in which the occurrence of a trouble is prevented which is due to the damage of the spool shaft or the bearings.

A conventional double-bearing type fishing reel is designed as follows: That is, as disclosed by Japanese Utility Patent Application Publication No. 1811/1992, a spool shaft having a spool is rotatably supported through bearings between the side boards of the reel body.

When manufactured, or when taken care of or repaired after fishing, the spool having the spool shaft is often coupled to and decoupled from the reel body. For this purpose, the end portions of the spool shaft are inserted into the bearings provided between the side boards. This work is sometimes rather difficult, and the surfaces of the inside-diameter holes of the bearings may be damaged, and in the case of ball bearings, the balls may be damaged. Those damages may produce abnormal noises when the spool is turned in the reverse direction to let out the fishing line.

On the other hand, recently, in order to improve the rotational performance of the spool, the spool bearing section has been decreased in diameter, and accordingly the bearings have been also decreased in diameter. Hence, it is not simple to insert the end portion of the spool shaft into the bearing; that is, the reel is low in assembling work efficiency.

SUMMARY OF THE INVENTION

BRIEF DESCRIPTION OF THE DRAWINGS

FIG. 3 is an enlarged plan view, with parts cut away, showing essential components inside a side board which is located on the side which is opposite to the side where the handle is provided.

FIG. 4 is an enlarged plan view, with parts cut away, showing essential components inside a side board which is located on the side which is opposite to the side where the handle is provided.

DETAILED DESCRIPTION OF THE PREFERRED EMBODIMENTS

Preferred embodiments of the invention will be described with reference to the accompanying drawings.

First Embodiment

Figure 1:
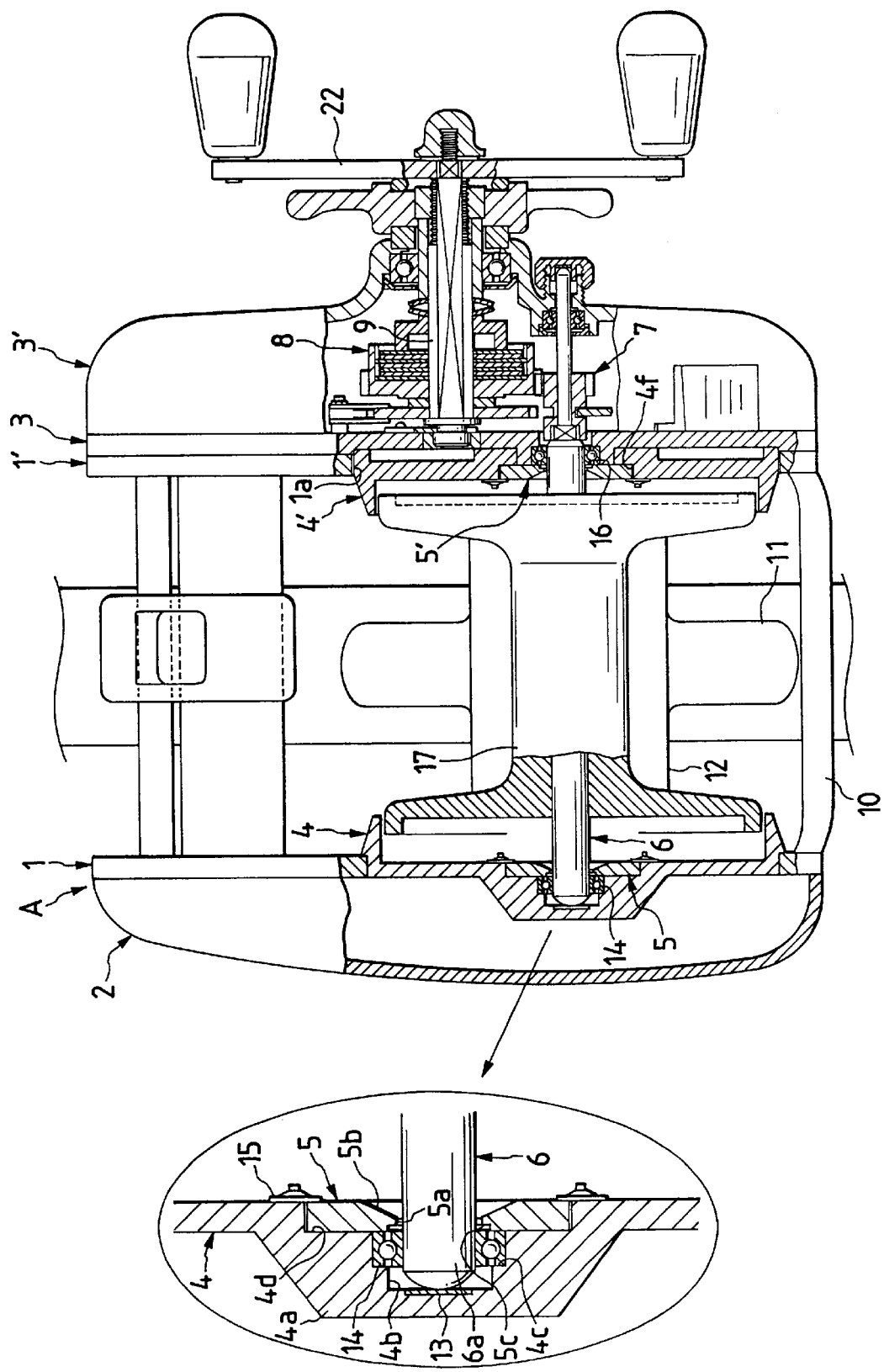
FIG. 1 is a plan view, with parts cut away, showing essential components of an example of a double-bearing type fishing reel, which constitutes a first embodiment of the invention, and a part of the fishing reel on an enlarged scale.
Figure 2:
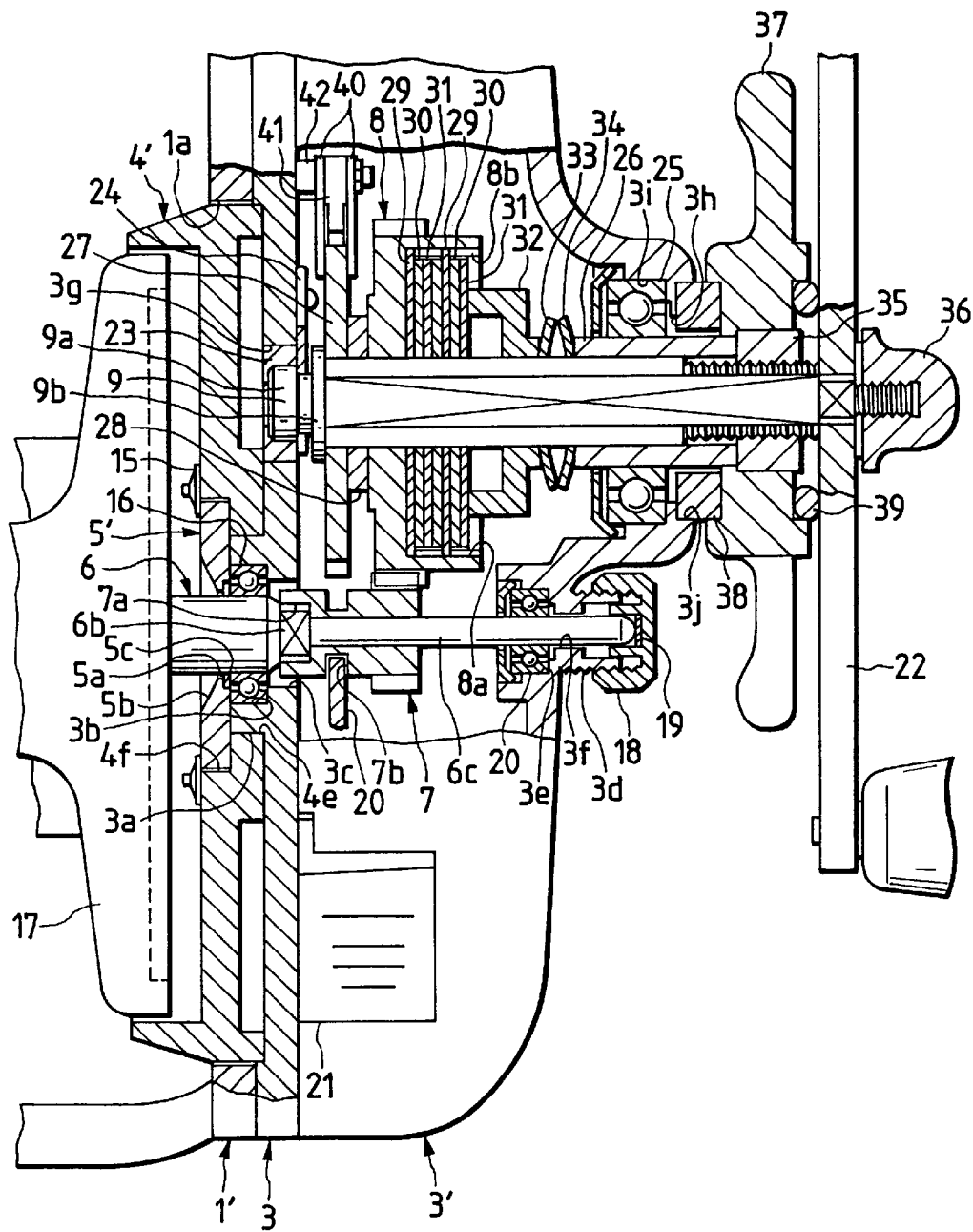
FIG. 2 is an enlarged plan view, with parts cut away, showing essential components of the fishing reel which are provided inside a side board which is located on the side where the handle is provided.

An example of a double-bearing type fishing reel, which constitutes a first embodiment of the invention, will be described with reference to FIGS. 1 and 2. FIG. 1 is a plan view, with parts cut away, showing essential components of the fishing reel, and a part of the fishing reel on an enlarged scale. FIG. 2 is a plan view, with parts cut away, showing essential components inside the side board which is on the side where the handle is located.

The double-bearing type fishing reel is designed as follows: The right and left frames 1' and 1 of a reel body A are held parallel by means of a plurality of supports 10 and a fixing board 12 fixing a reel leg 11. A side board 2 of the reel body A is detachably mounted on the outside of the left frame 1 with screws (not shown), while a supporting board 3 and a side board 3' of the reel body A are detachably mounted on the outside of the right frame 1' with screws (not shown).

A spool cover 4 is secured to the inside of the left frame 1, and a spool cover 4' is secured to the inside of the supporting plate 3.

The spool cover 4' is detachably inserted into a through-hole 1a in the right frame 1', and is protruded inside the right frame 1'.

A protrusion 4a is formed on the outer surface of the spool cover 4 at the center. The protrusions 4a has three stepped recesses 4b, 4c and 4d inside it, and a thrust bearing 13 is fixedly provided in the bottom of the recess 4b.

A bearing 14 is fitted in the recess 4c.

A guide member 5 is fitted in the recess 4d. The bearing 14 and the guide member 5 are prevented from coming off by means of a spring washer 15 locked to pins which are integral with the spool cover 4 or secured to the latter 4.

The bearing 14 and the guide member 5 may be prevented from coming off by means of screws.

The support 3 has a cylinder 3a inside it. The cylinder 3a includes a recess 3b and a through-hole 3c.

The cylinder 3a is inserted into a through-hole 4e of the spool cover 4', and a bearing 16 is fitted in the recess 3b.

A recess 4f is formed in the inside of the spool cover 4' at the center. A guide member 5' is fitted in the recess 4f. The bearing 16 and the guide member 5' are prevented from coming off by means of a spring washer 15 which is locked to pins which are integral with the spool cover 4' or secured to the latter 4'.

The bearings 14 and 16 support a spool shaft 6, on which a spool 17 is fixedly mounted. More specifically, the spool 17 is rotatably provided between the right and left frames 1' and 1.

One end portion 6a of the spool shaft 6 is supported by the bearing 14, and abutted against the thrust bearing 13.

The other end portion of the spool shaft 6 is supported by the bearing 16, and has an engaging portion 6b.

A small-diameter portion 6c is extended from the engaging portion 6b to the right. A pinion 7 is mounted on the small-diameter portion 6c in such a manner that it is axially movable.

A cylinder-shaped shaft supporting portion 3d is extended from the outer surface of the side board 3'.

The outer cylindrical surface of the shaft supporting portion 3d is male-threaded, so that a cover knob 18 is threadably engaged with the shaft supporting portion 3d. A thrust bearing 19 is fixedly set in the inner surface of the bottom of the cover knob 18, and the end of the small-diameter portion 6c is abutted against the thrust bearing 19.

The shaft supporting portion 3d has a recess 3e and a through-hole 3f inside it. A bearing 20 is fitted in the recess 3e to support the small-diameter portion 6c.

In the first embodiment, the spool covers 4 and 4' are a pair of confronting members of the spool 17.

The spool covers 4 and 4' have the guide members 5 and 5', respectively. The guide members 5 and 5' have spool-shaft inserting holes 5a which are slightly larger in diameter than the inside diameter of the bearings 14 and 16. And a tapered guide surface 5b adapted to guide the spool shaft 6 to the inserting hole 5a is formed around the latter 5a.

The guide members 5 and 5' have recesses 5c on the sides of the bearings 14 and 16, respectively.

The pinion 7, which is axially movably mounted on the small-diameter portion 6c of the spool 6 disposed between the supporting board 3 and the side board 3', has an engaging portion 7a. The latter 7a and an engaging portion 6b of the spool shaft 6 form a clutch mechanism.

The pinion 7 has an annular groove 7b, in which a clutch board 20 is inserted. The clutch board 20 is operated by a clutch lever 21.

The pinion 7 is engaged with a drive gear 8, which is mounted on a handle shaft 9.

A handle 22 is coupled to the handle shaft 9, so that the spool 17 is turned through the drive gear 8 and the pinion 7 by the rotation of the handle 22.

The supporting board 3 has a recess 3g in the right surface, in which a bearing is fitted. One end portion 9a of the handle shaft 9 is rotatably fitted in the recess 3g, and is prevented from coming off by means of a retaining plate 24.

The side board 3' has a through-hole 3h, and a recess 3i.

A bearing 25 is fitted in the recess 3i.

The handle shaft 9 is rotatably supported through the aforementioned bearing 25 and a collar 26 which is mounted on the handle shaft 9 in such a manner that it is axially movable but not rotatable around the handle shaft.

The handle shaft 9 has a flange 9b at the end and on the left side of the drive gear 8. A ratchet wheel 27 and a frictional board 28 are mounted on the handle shaft 9 in such a manner that the ratchet wheel 27, the frictional board 28, and the flange 9b are stacked one on another. More specifically, the ratchet wheel 27 is mounted on the handle shaft 9 in such a manner that it is prevented from turning around the latter 9.

The drive gear 8 includes an accommodating section 8a which is made up of a recess adapted to accommodate the brake boards of a drag mechanism.

In the accommodating section 8a, a brake board 29, a frictional board 30, a brake board 31, a frictional board 30, a brake board 29, a frictional board 30, and a brake board 31 of the drag mechanism are set in the stated order.

The brake board 29 is abutted against the bottom of the accommodating section 8a.

Furthermore, on the inner cylindrical surface of the accommodating section 8a, a pair of protrusions 8b are extended in the direction of axis. The brake boards 29 are rotatably mounted on the handle shaft 9, and engaged with the pair of protrusions 8b.

The brake boards 31 are mounted on the handle shaft 9 in such a manner that they are prevented from rotating around the latter 9, and are rotatably engaged with the drive gear 8.

A pressing board 32, which is mounted on the handle shaft 9 in such a manner that it is prevented from turning around the latter 9, is abutted against the brake board 31 on the side of the opening of the drive gear 8.

Springs 33 and 34, which are mounted on the handle shaft 9 in such a manner that they are not rotatable around the latter 9, are pushed against the right side of the pressing board 32.

The spring 34 is abutted against the aforementioned collar 26.

The collar 26 is abutted against a nut 35 which is threadably engaged with the handle shaft 9.

The handle 22 is mounted on the right end portion of the handle shaft 9 which is outside the nut 35 in such a manner that it is not rotatable around the handle shaft 9. The handle 22 is prevented from coming off with a box nut 36 fixed.

The nut 35 is fitted in a polygonal through-hole of a drag adjust knob 37 in such a manner that it is axially movable.

An intermediate member 38, which is made of metal, hard synthetic resin, or hard felt, is interposed between the drag adjust knob 37 and the reel side board 3. An intermediate member 39, which is an O-ring, is interposed between the drag adjust knob 37 and the handle 22.

The handle shaft 9 is supported by a bearing 25, and a recess 3j is formed in the side surface of the side board 3' which is located outside the bearing 25. An intermediate member 38 is rotatably fitted in the recess 3j.

The ratchet wheel 27 is mounted on the handle shaft 9 in such a manner that it is not rotatable around the latter 9. Outside the ratchet wheel 27, a reverse-rotation preventing pawl 42 held between leaf springs 40 and 40 is swingably mounted on a shaft 42. The leaf springs 40 and 40 hold both side surfaces of the ratchet wheel 27, and the reverse-rotation preventing pawl 41 is engaged with locking teeth formed in the outer periphery of the ratchet wheel 27.

When manufactured, or when taken care of or repaired after fishing, the spool 17 is coupled to and decoupled from the reel body. For this purpose, the end portions of the spool shaft 6 are inserted into the bearings 14 and 16 provided. In this case, the end portions of the spool shaft 6 are pushed against the tapered guide surfaces 5b of the guide members 5 and 5'. As a result, the end portions of the spool shaft 6, being guided by the tapered guide surfaces 5b, are inserted into the spool-shaft inserting holes 5a which are slightly larger in diameter than the inside diameter of the bearings 14 and 16, and then inserted into the bearings 14 and 16, respectively.

The double-bearing type fishing reel operates as follows: When, with the engaging portion 6b of the spool shaft 6 engaged with the engaging portion of the pinion 7, the handle 22 is turned; that is, when, with the clutch placed in the "on" state, the handle 22 is turned, the pinion 7 is turned through the drive gear 8 which is turned by the braking force provided by the rotation of the handle shaft 9, so that the fishing line is wound on the spool 17.

The braking force of the drive gear 8 which is frictionally coupled to the handle shaft 9 through the drag mechanism can be adjusted by turning the drag adjust knob 37.

When the ratchet wheel 27 is turned by the rotation of the handle shaft 9, the friction between the ratchet wheel 27 and the leaf springs 40 and 40 turns the left springs 40 and 40 and the reverse-rotation preventing pawl 41, so that the end portion of the latter 41 is spaced away from the locking teeth of the ratchet wheel 27, whereby the latter 27 is turned together with the drive gear 8.

Next, when the spool 17 is turned in the reverse direction so that the fishing line is let out, the drive gear 8 and the ratchet wheel 27 are turned in the opposite direction, so that the leaf springs 40 and 40 and the reverse-rotation preventing pawl 41 are swing whereby the end portion of the reverse-rotation preventing pawl 41 is locked to one of the locking teeth of the ratchet wheel 27.

As a result, the handle shaft 9 is held stopped, and therefore the drive gear 8 is turned against the preset braking force.

The double-bearing type fishing reel of the invention is designed as described above. Hence, after removed from the reel body A, the spool 17 may be assembled as follows: First, the end portions of the spool shaft 6 are pressed against the tapered guide surfaces 5b of the guide members 5 and 5'. As a result, the end portions of the spool shaft 6, being guided by the tapered guide surfaces 5b, are inserted into the spool-shaft inserting holes 5a which is slightly larger in diameter than the inside diameter of the bearings 14 and 16, and then inserted into the bearings 14 and 16 with ease.

In the above-described assembling work, although the end portion of the spool shaft 6 is reduced in diameter, the spool shaft 6 is readily fitted in the two bearings 14 and 16. With the fishing reel of the invention, the assembling work is simple, and is high in efficiency. In addition, the bearings are positively prevented from being damaged. Furthermore, when the fishing line is let out, the generation of an abnormal sound and the occurrence of vibration are eliminated.

Moreover, the bearings are sealed well; that is, they are high both in corrosion resistance and in durability.

The first embodiment may be modified as follows: The spool-shaft inserting holes which are slightly larger in diameter than the inside diameter of the bearings 14 and 16 are formed in the spool covers 4 and 4', and tapered guide surfaces adapted to guide the spool shaft 6 to the inserting holes are formed around the latter (the inserting holes). In this case, a portion of each of the spool covers 4 and 4' where the spool shaft 6 is supported corresponds to the confronting member, and a portion of each of the spool covers 4 and 4' where the spool-shaft inserting hole and the tapered guide surface are provided corresponds to the guide member.

In this connection, a cylinder and a recess may be formed in the outer surface of the spool cover 4. In this case, the bearing 14 is fitted in the recess thus formed. The end of the spool shaft 6 may be abutted against the thrust bearing in the side board 2, similarly as in the case of a third embodiment (described later).

Second Embodiment

Figure 3:
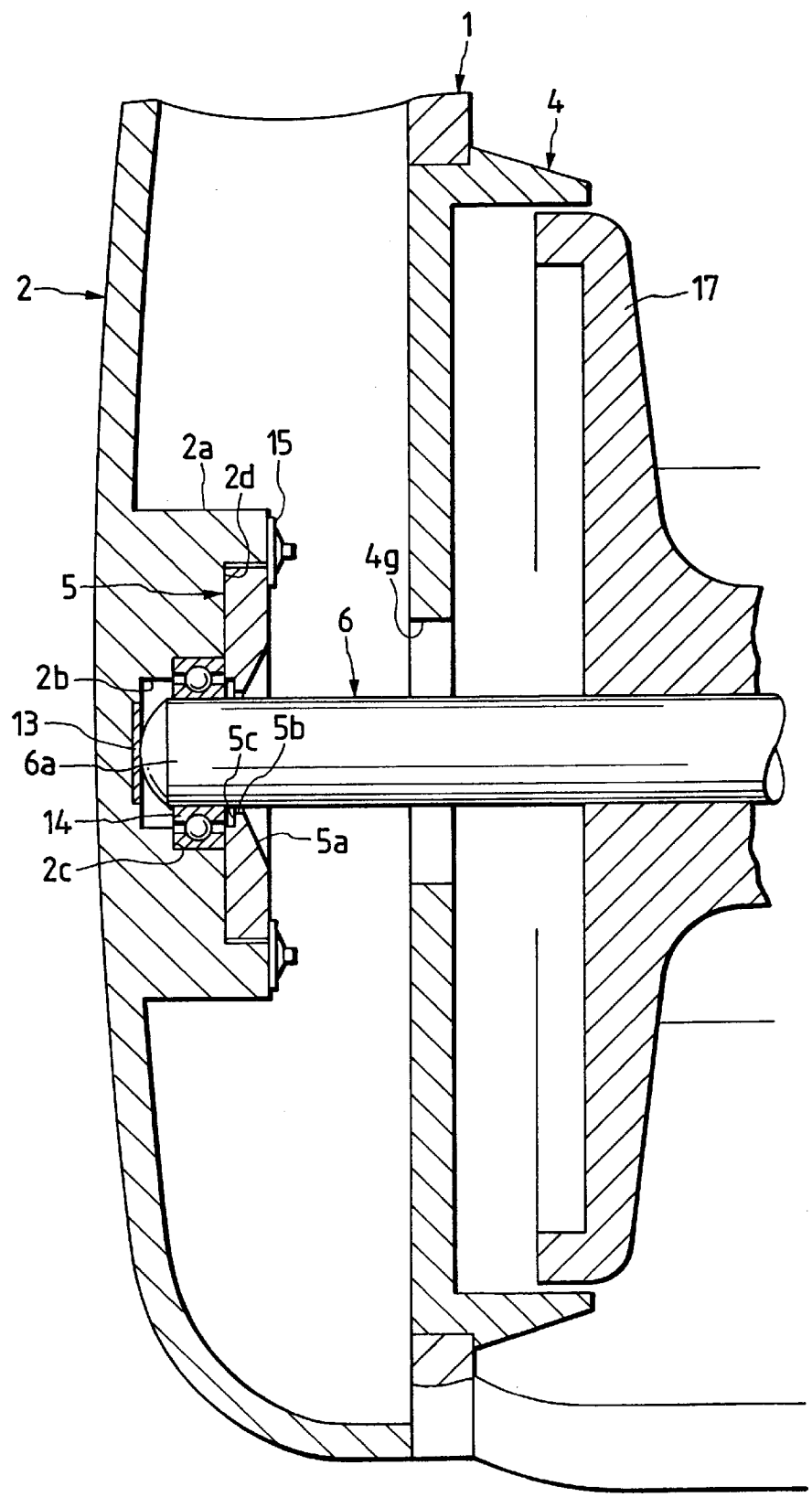
FIG. 3 shows another example of the double-bearing type fishing reel, which constitutes a second embodiment of the invention. More specifically.

FIG. 3 shows another example of the double-bearing type fishing reel, which constitutes a second embodiment of the invention. More specifically, FIG. 3 is an enlarged plan view, with parts cut away, showing essential components inside the side board located on the side which is opposite to the side where the handle is provided.

In the second embodiment, a cylinder 2a is protruded from the inside of the side board 2 provided on the left frame 1 (which is located on the side which is opposite to the side where the handle is provided). The cylinder 2a has three stepped recesses 2b, 2c, and 2d inside it.

A thrust bearing 13 is fixedly set in the bottom of the recess 2b.

A bearing 14 is fitted in the recess 2c.

A guide member 5 is fitted in the recess 2d. More specifically, the bearing 14 and the guide member 5 are prevented from coming off by means of a spring washer 15 secured to pins which are integral with or secured to the side board 2. The bearing 14 and the guide member 5 may be prevented from coming off by means of screws.

The spool cover 4 has a large-diameter through-hole 4g at the center.

In the second embodiment, the side board 2 is the confronting member of the spool 17. The other arrangements are equal to those of the above-described first embodiment.

The technical concept of the second embodiment may be applied to the mounting structure of the bearing 20 in the side board 3 which supports the end of the small-diameter portion 6c of the spool shaft 6 in the first embodiment.

Third Embodiment

Figure 4:
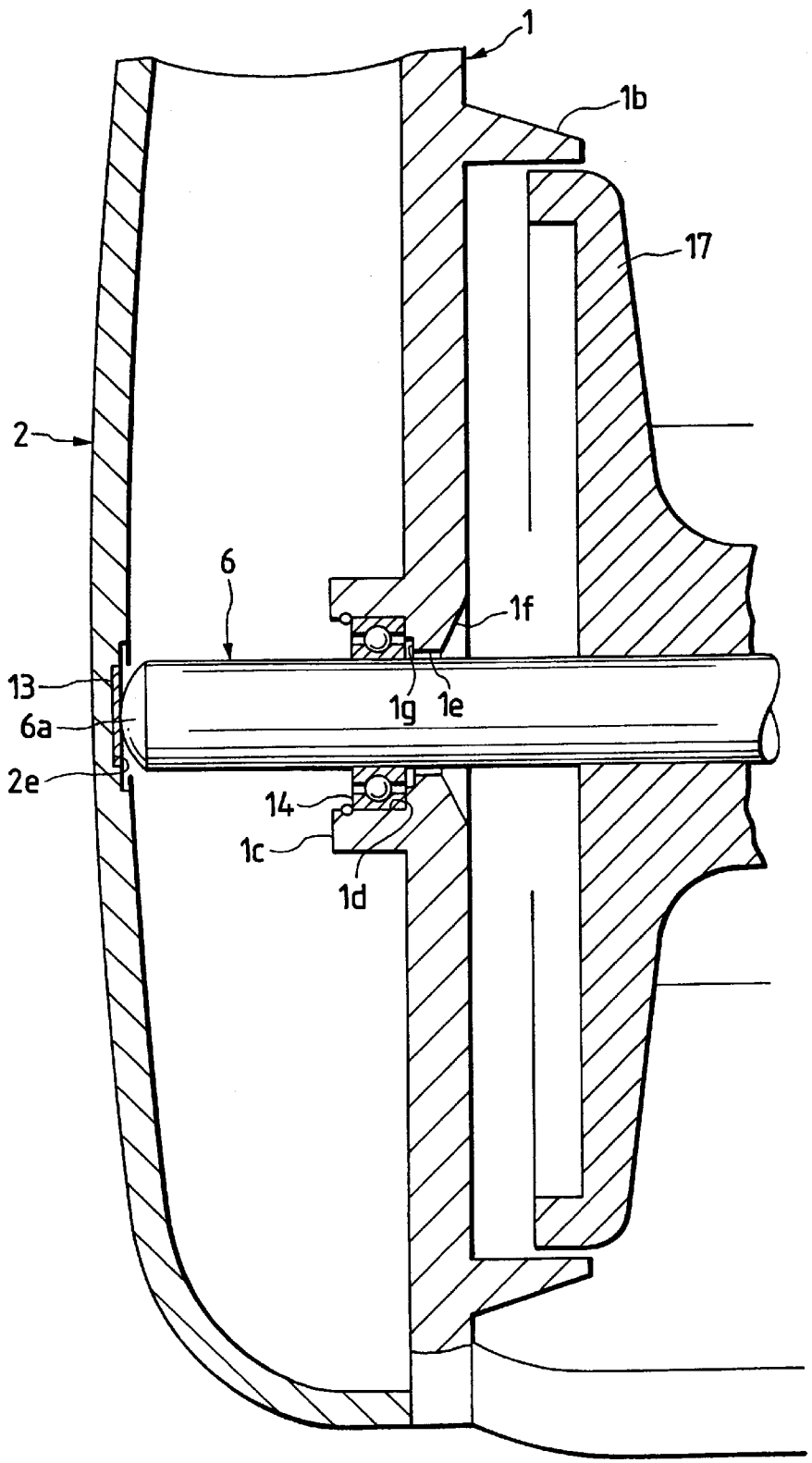
FIG. 4 shows another example of the double-bearing type fishing reel, which constitutes a third embodiment of the invention. More specifically.

FIG. 4 shows another example of the double-bearing type fishing reel, which constitutes a third embodiment of the invention. More specifically, FIG. 3 is an enlarged plan view, with parts cut away, showing essential components inside the side board located on the side which is opposite to the side where the handle is provided.

In the third embodiment, the spool cover 1b is integral with the left frame 1, and a cylinder 1c is protruded from the outside of the left frame 1.

The cylinder 1c has a recess 1d, in which the bearing 14 is fitted.

The left side frame 1 has a spool-shaft inserting hole 1e which is equal in configuration to the one which is formed in the guide member in the first embodiment, and is slightly larger in diameter than the inside diameter of the bearing 14. Around the inserting hole 1e, a tapered guide surface if is formed to guide the spool shaft 6 to the inserting hole 1e.

The inserting hole 1e has a recess (or step) if on the side of the bearing.

The side board 2 has a shallow recess 2e in the inner surface, and a thrust bearing 13 is fixedly fitted in the bottom of the shallow recess 2e.

In the third embodiment, the left frame 1 is a confronting member of the spool 17.

The other arrangements are substantially equal those of the above-described first embodiment.

In the third embodiment, after removed from the reel body A, the spool is assembled as follows: The end of the spool shaft 6 is pushed against the tapered guide surface if of the left frame 1. As a result, the end of the spool shaft 6, being guided by the tapered guide surface 1f, is inserted into the inserting hole 1e which is slightly larger in diameter than the inside diameter of the bearings 14 and 16. Thus, both ends of the spool shaft are inserted into the bearings 14 and 16, respectively.

In the above-described embodiments, the right and left frames 1' and 1 of the reel body A are held parallel by means of a plurality of supports 10 and the fixing board 12 adapted to fix the reel leg 11; however, the frames, the supports, and the fixing board may be provided as one unit to hold the right and left frames in parallel with each other.

Effect of the Invention

The end portion of the spool shaft, when abutted against the tapered guide surface of the guide member, is moved along the tapered guide surface and inserted into the spool-shaft inserting hole which is slightly larger in diameter than the inside diameter of the bearings, and then inserted into the bearing with ease.

In this assembling work, the end portion of the spool shaft is readily inserted into the bearing although its diameter is reduced. That is, with the fishing reel of the invention, the assembling work is simple, and is high in efficiency. In addition, the bearings are positively prevented from being damaged. Furthermore, when the fishing line is let out, the generation of an abnormal sound and the occurrence of vibration are eliminated.

Moreover, the bearings are sealed well; that is, they are high in corrosion resistance and in durability.

What is claimed is:

1. A double-bearing fishing reel in which a spool having a spool shaft is rotatably supported between side frames of a reel body, said reel comprising:

a confronting member comprising three stepped recesses, a bearing mounted in a second recess of said three stepped recesses on said confronting member for receiving and rotatably supporting the spool shaft; and a guide member mounted on a first recess of said three stepped recess formed on the confronting member, said guide member defining:

a spool-shaft inserting hole located close to the bearing and having a diameter slightly larger than an inside diameter of the bearing, and a tapered guide surface, located axially opposite from the bearing with respect to the inserting hole and formed around the inserting hole, for guiding the spool shaft to the inserting hole.

2. A double-bearing fishing reel according to claim 1, wherein an end of said spool shaft is received in an area formed by a third recess of said three stepped recesses on said confronting member.

* * * * *